Jan. 7, 1964  J. V. DAVIS  3,116,821
ELEVATING AND TRANSFER MECHANISM
Filed Sept. 11, 1961  6 Sheets-Sheet 2

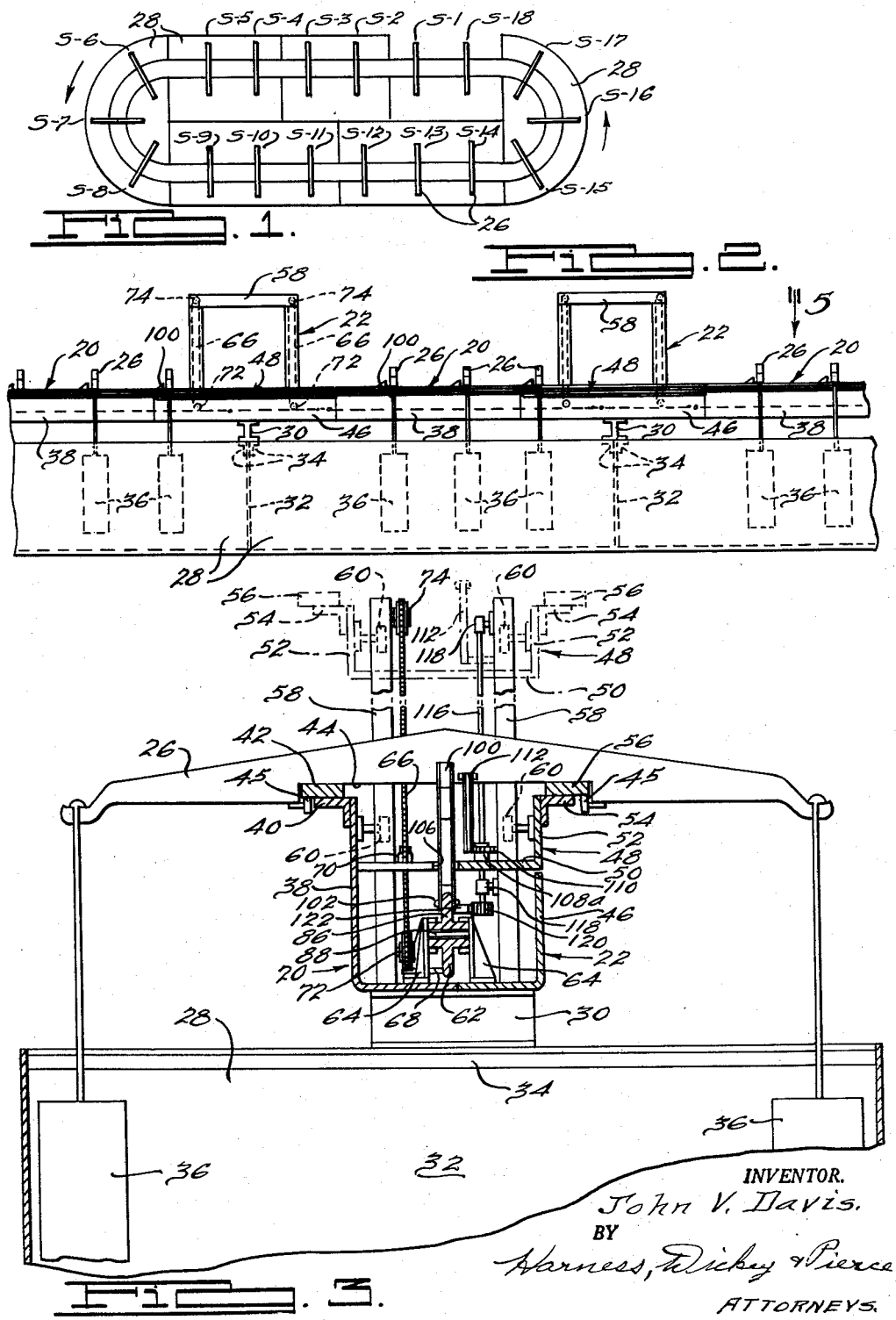

INVENTOR.
John V. Davis,
BY
Harness, Dickey & Pierce
ATTORNEYS.

Jan. 7, 1964    J. V. DAVIS    3,116,821
ELEVATING AND TRANSFER MECHANISM
Filed Sept. 11, 1961    6 Sheets-Sheet 3

INVENTOR.
John V. Davis.
BY
Harness, Dickey & Pierce
ATTORNEYS.

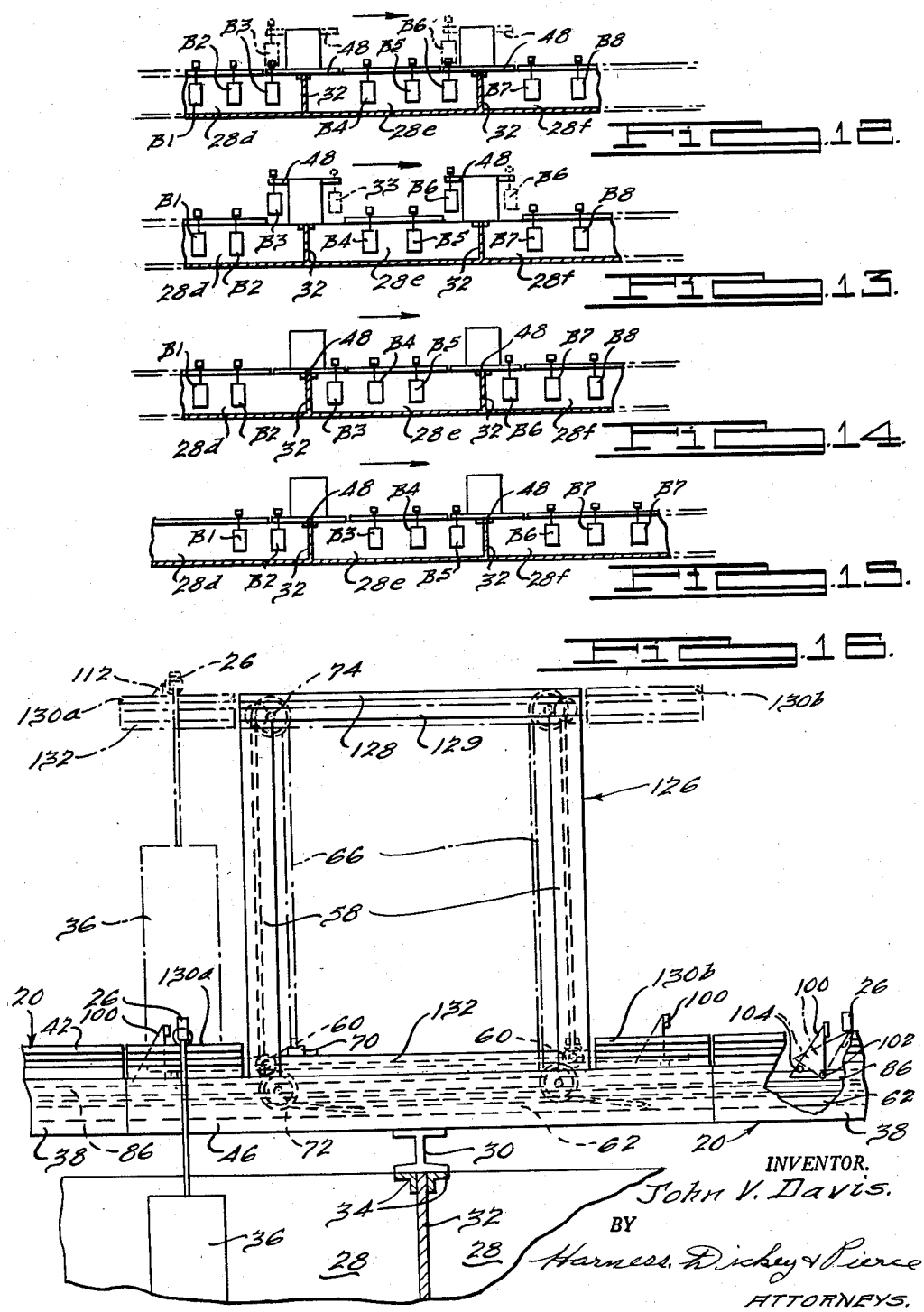

Jan. 7, 1964  J. V. DAVIS  3,116,821
ELEVATING AND TRANSFER MECHANISM
Filed Sept. 11, 1961  6 Sheets-Sheet 5
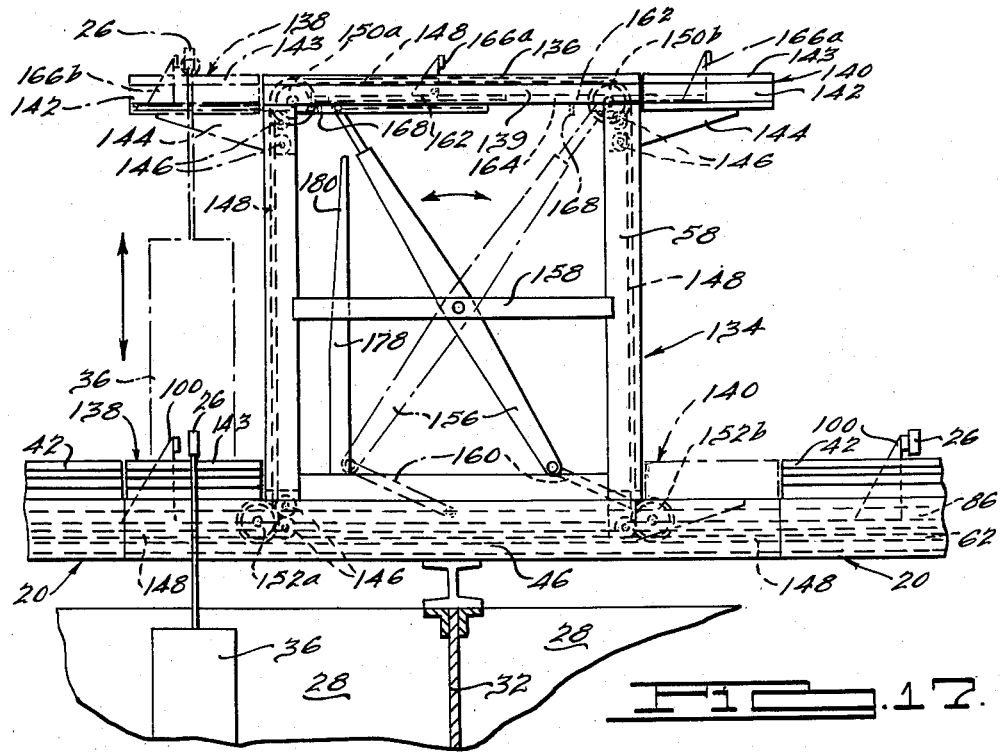
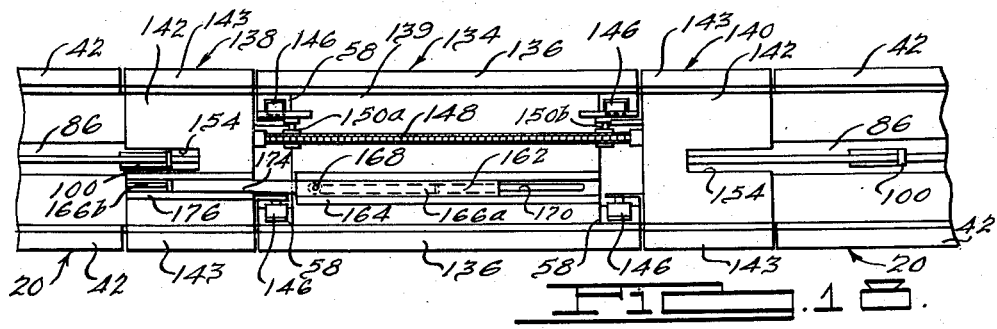
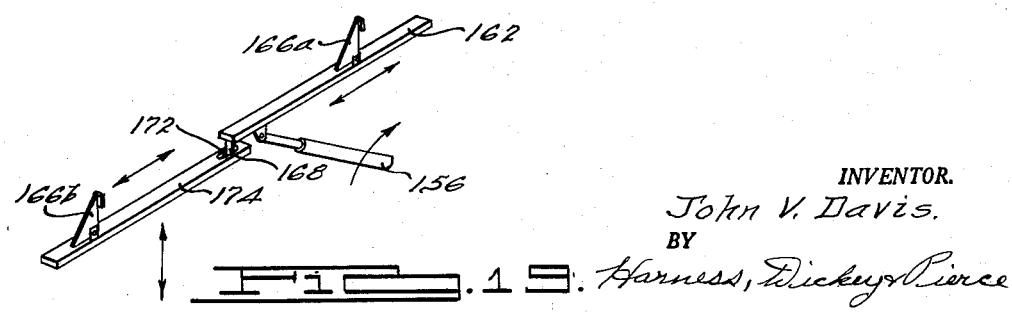
INVENTOR.
John V. Davis.
BY
ATTORNEYS.

Jan. 7, 1964    J. V. DAVIS    3,116,821
ELEVATING AND TRANSFER MECHANISM
Filed Sept. 11, 1961    6 Sheets-Sheet 6
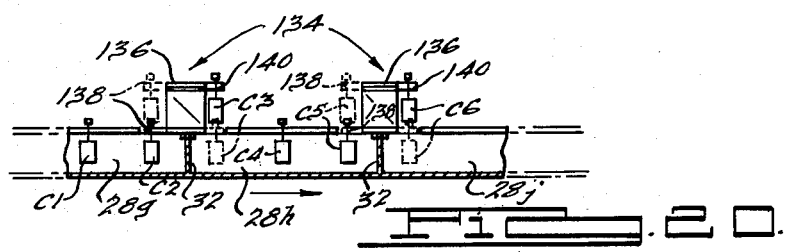
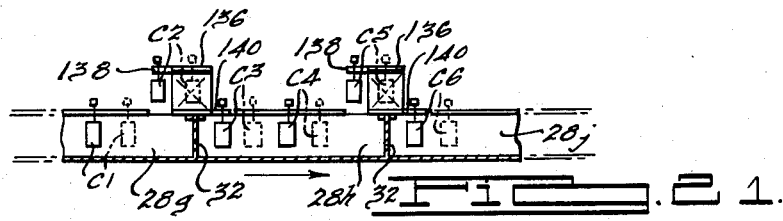
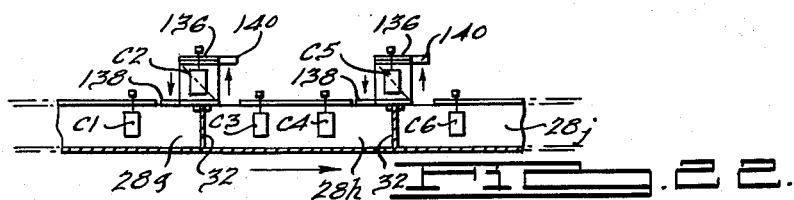
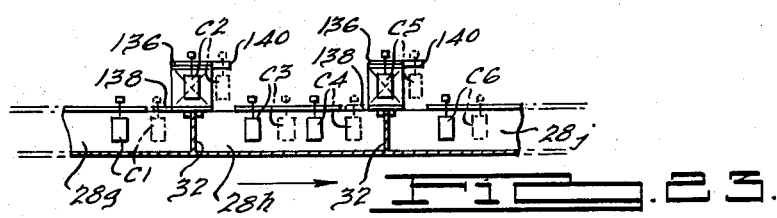
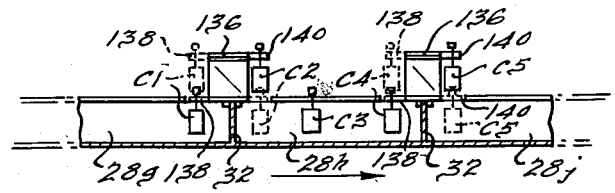
INVENTOR.
John V. Davis,
BY
Harness, Dickey & Pierce
ATTORNEYS.

United States Patent Office 3,116,821
Patented Jan. 7, 1964

3,116,821
ELEVATING AND TRANSFER MECHANISM
John V. Davis, Grosse Pointe Farms, Mich., assignor to The Udylite Corporation, Detroit, Mich., a corporation of Delaware
Filed Sept. 11, 1961, Ser. No. 137,263
15 Claims. (Cl. 198—19)

The present invention broadly relates to conveying apparatus for transferring a plurality of workpieces through a series of treating stations, and more particularly to an improved combination elevating and transfer mechanism which is incorporated at selected points of the conveying machine for raising a work carrier and transferring it above an obstruction or tank partition separating adjoining treating stations.

The conveying machine and the combination elevating and transfer mechanism comprising the present invention is comprised of a series of assemblable and disassemblable standardized sections including fixed transfer sections, a power section, arcuate turnaround transfer sections, and combination elevating and transfer sections. The aforementioned sections are each of a standardized construction enabling assembly thereof into a conveying machine having the appropriate length and configuration consistent with the specific treating sequence to be performed on the workpieces transferred thereby and the specific plant layout in which the machine is to be installed. The assemblable and disassemblable characteristics and standardized construction of the conveying machine comprising the present invention obviates the heretofore time-consuming and costly practice of custom designing conveying apparatus of this general type or extensively modifying an existing machine to adapt it to a specific plant layout and treating operation.

The combination elevating and transfer mechanism of the present invention is incorporated at selected stations of the conveying machine and is connected to the adjoining fixed transfer sections so as to provide a lifting of the workpieces conveyed therealong above the partitions of adjoining treating receptacles when a liquid treating sequence such as an electroplating operation, for example, is being performed on the workpieces. The lifting and transfer operation of the combination elevating and transfer section is readily coordinated with the transfer movement of the principal conveying machine along the fixed and arcuate transfer sections thereof.

It is accordingly a primary object of the present invention to provide a sectionalized conveying machine comprising a plurality of assemblable and disassemblable standardized sections which can be readily assembled in any specific arrangement most suitable for a specific plant layout providing for an automatic integrated conveying machine having a prescribed operating function.

Another object of the present invention is to provide a sectionalized conveying machine comprising a series of standardized sections providing versatility and flexibility heretofore unobtainable in automatic conveying apparatus heretofore known.

Still another object of the present invention is to provide a sectionalized conveying machine comprising a series of standardized assemblable and disassemblable sections which can be mounted directly above and supported on a series of aligned treating receptacles providing therewith a versatile, light weight, and compact construction.

A further object of the present invention is to provide a sectionalized conveying machine comprising a series of standardized sections mounted directly above and supported by an aligned series of treating receptacles which does not incorporate any large, heavy, overlying superstructure thereby providing for higher lifting movements for a given overhead clearance enabling the use of deeper treating stations and longer work racks providing for increased production capacity and concurrently simplifying the structure of the machine.

A still further object of the present invention is to provide a sectionalized conveying machine comprising a series of assemblable standardized sections which substantially reduces the design and development engineering effort heretofore required to produce a machine having a prescribed operating function and which obviates the present time consuming and costly practice of preliminarily assembling and testing a custom designed conveying machine and thereafter disassembling the machine for shipment and reassembling the machine at the operating plant.

Yet still another object of the present invention is to provide a sectionalized conveying machine comprising a series of assemblable standardized sections which is of simple design, of durable operation, and of economical manufacture and operation.

The foregoing and other objects of the present invention are achieved by providing a conveying machine having a sectionalized construction comprising a series of assemblable standardized conveyor sections including fixed transfer sections available in a series of standardized lengths which are readily connectible to arcuate fixed transfer sections and combination elevating and transfer sections each of which include track means for movably supporting and transferring a series of work carriers through a predetermined treating sequence. The several sections comprising the machine are adapted to be supported directly on the upper end portions of a series of aligned treating receptacles out of contact with any treating solutions contained therein. The transfer movement of the work carriers along the several standardized interconnected sections is achieved by a mechanically coordinated transfer mechanism and the lifting movement of the several combination elevating and transfer sections is achieved in coordinated unison and in response to power means contained in a power section of the conveying machine.

Other objects and advantages of the present invention will become apparent from the following detailed description taken in conjunction with the accompanying drawings, wherein:

FIGURE 1 is a schematic plan view of an assembled sectionalized conveying machine arranged in a continuous loop configuration forming therewith a turnaround type machine;

FIG. 2 is a fragmentary side elevation view taken along one of the straight side sections of a typical conveying machine;

FIG. 3 is a transverse vertical sectional view through the conveying machine shown in FIG. 4 and taken along substantially lines 3—3 thereof;

FIGS. 12 through 15 are schematic side elevation views illustrating an alternate operating sequence of the conveying machine by reversing the direction of reciprocation of the principal and auxiliary pusher mechanisms;

FIG. 16 is a fragmentary side elevation view of an alternate satisfactory construction of the combination elevating and transfer section incorporating a vertically fixed center track section and a pair of movable end sections;

FIG. 17 is a fragmentary side elevation view of still another alternate satisfactory combination elevating and transfer section similar to that shown in FIG. 11 but wherein the end sections move independently of each other and in opposite directions;

FIG. 18 is a plan view of the combination elevating and transfer section shown in FIG. 17;

FIG. 19 is a perspective view of the pusher mechanism employed in the combination elevating and transfer section shown in FIGS. 17 and 18, and FIGS. 20 through 24 are schematic fragmentary side elevation views illustrating a typical automatic operating sequence of the conveying machine incorporating combination elevating and transfer sections of the type shown in FIG. 17.

Figure 4:
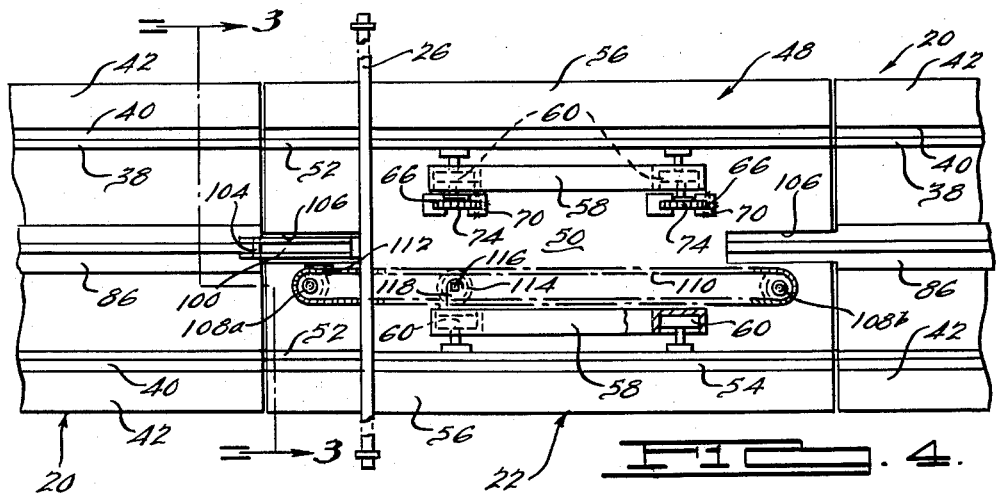
FIG. 4 is a plan view of a combination elevating and transfer section illustrating particularly the transfer mechanism mounted thereon.

Referring now in detail to the drawing and as may be best seen in FIGURES 1 to 5, a conveying machine embodying therein the preferred embodiments of this invention is comprised of a series of standardized conveyor sections connected at their ends and including a plurality of fixed transfer or conveyor sections 20, combination elevating and transfer or lift sections 22 and a power section 24. A typical arrangement of the fixed conveyor sections, lift sections, and power sections is schematically illustrated in FIGURE 1 wherein the sections are assembled in a continuous loop comprising a pair of straight side sections connected at their ends by arcuate turnaround sections. The arrangement shown in FIGURE 1 provides for a conveying machine of the so-called turnaround type whereby a plurality of work carriers, generally designated at 26, are intermittently transferred along the several conveyor sections and the workpieces supported therefrom undergo the prescribed treating sequence as they are sequentially conveyed through a series of aligned treating receptacles 28. The workpieces are loaded on the work carriers 26 at a load station such as station S–1 and are thereafter conveyed through the treating stations S–2 through S–17 in the direction of the arrows and are raised periodically by the lift sections in order to enable the workpieces to be transferred over the partitions separating adjoining treating receptacles. At the completion of the treating sequence, the workpieces are unloaded from the work carriers at an unload station indicated in FIGURE 1 as S–18 disposed adjacent the load station S–1.

While the exemplary conveying machine shown in FIGURE 1 is of the turnaround type, it will be appreciated by those skilled in the art that the fixed conveyor sections 20, lift sections 22, and power section 24, can be arranged in a straight line or in any specific configuration such as an L-shape, or V-shape, for example, consistent with the particular plant layout and treating sequence to be achieved so as to provide coordination with other processing machines achieving thereby an optimum flow of work through the plant. The sectionalized construction of the conveying machine comprising a series of assemblable and disassemblable sections provides optimum flexibility and versatility in achieving the desired work flow pattern. The individual standardized conveyor sections can be joined at their ends by any suitable means such as bolting, welding, or the like, depending on the permanency of the installation.

The fixed conveyor sections 20, the lift sections 22, and the power section 24, as shown in FIGS. 2 through 5, extend above the treating receptacles 28 and are supported by a short beam 30 mounted on the upper edge of a transverse partition 32 which separates the adjoining treating receptacles 28. The upper edges of the partitions 32 are preferably reinforced such as by angle iron braces 34. Each of the lift sections 22 is supported on and extends to each side of the treating receptacle partitions 32 and is effective to lift the work carriers 26 and work racks 36 suspended therefrom over the partitions 32 to the first station of the next adjoining treating receptacle. The fixed conveyor sections 20 extend between and are connected to the ends of the lift sections 22 as shown in FIG. 2. The fixed conveyor sections 20 are provided in a series of standardized lengths in order to compensate for variations in the length of the multiple station treating receptacles 28.

The fixed conveyor sections 20 are comprised of a U-shaped channel or frame member 38 comparing a base portion and a pair of upstanding side flanges integrally connected thereto as shown in FIGS. 3 and 4. A longitudinal angle iron track support member 40 is fixedly secured along the upper outer end portions of each of the upright flanges of the U-shaped frame member 38 on which a fixed supporting rail 42 is securely fastened to the upper surface thereof forming therewith a track. The work carrier 26 as shown in FIG. 3 extends transversely of the supporting rails 42 and is provided with a recess 44 along the lower edge thereof for slidably engaging the outer edges and upper surface of the track. Each side of the work carrier 26 is preferably provided with a roller 45 disposed in rolling bearing contact against the underside of the fixed supporting rails 42 and the rails of the lift sections 22 to prevent lateral tipping of the work carrier.

The lift sections 22 as shown in FIGS. 3 and 4 are similarly comprised of a U-shaped frame member 46 corresponding substantially in width to the U-shaped frame member 38 of the fixed conveyor sections 20. The upstanding side flanges of the U-shaped frame members 46 of the lift sections are of shorter length than the upstanding flanges of the frame members 38 and the upper edges thereof serve as a supporting base for a U-shaped lift frame 48 which is shown in the lowered position in solid lines in FIG. 3 and in the raised position in phantom. The lift frame 48 is comprised of a base flange 50 and a pair of upstanding side flanges 52 integrally connected to the base flange 50. An angle iron track support member 54 is secured to and extends longitudinally along the upper outer edge of each of the side flanges 52 on which a lift rail section 56 is secured forming therewith a track which is alignable with the fixed supporting rails 42 of the fixed conveyor sections when the lift frame 48 is in the lowered position. The lift frame 48, the track support 54, and the lift rail sections 56 extend the full length of the lift section 22 as shown in FIGS. 2 and 4.

It will be appreciated that all or portions of the fixed supporting rails 42 and lift rail sections 56 can be electrified at desired stations wherein an electroplating operation is to be performed by any conventional means well-known to the art and in which case the electrified rail segments are insulated from the supporting framework.

The lift frame 48 is mounted for up and down movement between a lowered position wherein the lift rail sections 56 are disposed in end to end alignment with the adjoining fixed supporting rails 42 of the fixed conveyor sections 20 and an elevated position vertically spaced therefrom as shown in phantom in FIG. 3. Up and down guided movement of the lift frame 48 is achieved by a pair of inverted U-shaped guide members 58 each comprising an upper horizontal member and a pair of longitudinally spaced vertical members having the lower edges thereof supported on the base flange of the U-shaped frame member 46. The lift frame 48 is provided with a pair of guide rollers 60 rotatably mounted and extending inwardly from each side flange thereof which is disposed in rolling bearing contact against the inner surfaces of the vertical members of the guide members 58 which are of a channel shaped cross-section as shown in FIGS. 3 and 4. The coaction between the guide rollers 60 and guide members 58 serves to maintain the lift frame 48 in appropriate longitudinal and lateral alignment during the ascending and descending movement thereof.

The movement of the lift frame 45 to and from the lowered position and the raised position can be achieved by a number of suitable mechanisms including a double acting fluid actuated lift cylinder, a rack and pinion lift mechanism, and preferably by a coordinated reciprocable lift mechanism as hereinafter described. The exemplary coordinated lift mechanism shown in FIGS. 2 through 5 comprises a reciprocable lift bar 62 of a T-shaped cross section which extends through substantially the longitudinal center of the U-shaped frame member 38 of the fixed conveyor sections and the U-shaped frame 46 of the lift sections and is slidably supported at longitudinally spaced intervals in a series of guide shoes 64 mounted on the base flange of the U-shaped frame members as shown in FIG. 3.

A flexible element such as a lift chain 66 is connected at one end to a bracket 68 which extends laterally of and is affixed to the depending web of the lift bar 62. The other end of the lift chain 66 is pivotally affixed to a mounting bracket 70 secured to the upper surface of the base flange 50 of the lift frame 48 as shown in FIG. 3. The lift chain 66 extends from the bracket 68 longitudinally of the lift bar and is trained over a sprocket 72 rotatably mounted at the lower end portion of the guide member 58 and thereafter extends upwardly and is trained over a second sprocket 74 rotatably mounted at the upper end portion of the guide member 58 and thence downwardly to the mounting bracket 70. In accordance with this arrangement, the longitudinal reciprocation of the lift bar 62 from a retracted position to an advanced position is effective to extend the lift chain 66 along the lift bar causing its end connected to the mounting bracket 70 to pull upwardly and elevate the lift frame 48. In the preferred construction of the coordinated lift mechanism shown in the drawings, two lift chain assemblies are incorporated in each lift section to provide for uniform lifting of the lift frame 48 minimizing any skewing or twisting thereof during its ascending and descending movement.

Figure 5:
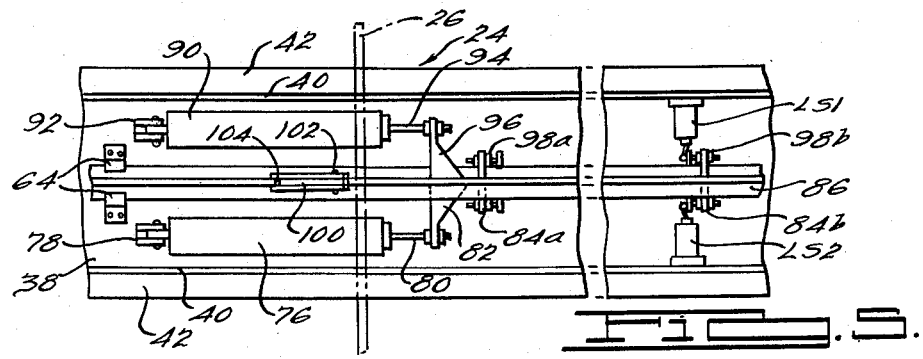
FIG. 5 is a fragmentary plan view of a fixed transfer power section of a sectionalized conveying machine.

Longitudinal reciprocation of the lift bar 62 can be achieved, for example, by a double acting fluid actuated lift cylinder 76 mounted in the power section 24 of the conveying machine. The power section 24 as shown in FIG. 5 is of a construction similar to the fixed conveyor sections 20 and can be positioned at any convenient point of the conveying machine between a pair of lift sections. The lift cylinder 76 as shown in FIG. 5, is pivotally secured at its closed end to a mounting bracket 78 affixed to the base flange of the U-shaped frame member 38 and the end of a piston rod 80 thereof is connected to a laterally depending ear 82 extending from and securely fastened to the depending web of the lift bar 62.

The reciprocating travel of the lift bar 62 in response to the reciprocating movement of the piston rod 80 is controlled by a limit switch LS2 disposed longitudinally of the lift bar as shown in FIG. 5 and is adapted to be tripped by a pair of actuators 84a, 84b adjustably affixed to the lift bar 62 when it attains the fully advanced and fully retracted positions, respectively. Actuation of the limit switch LS2 is operative to open and close solenoid actuated valves supplying pressurized fluid to the rod-end and to the blank-end of the lift cylinder 76 in accordance with the principal control circuit of the machine. In accordance with the construction of the lift mechanism disclosed, the lift frames 48 of the lift sections 22 are raised and lowered in unison in accordance with the controlled reciprocating travel of the lift bar 62 to which they are connected.

The work carriers 26 and the work racks 36 suspended therefrom are intermittently advanced along the fixed supporting rails 42 of the fixed conveyor sections 20 and the power section 24 by a reciprocable pusher mechanism comprising a pusher bar 86 of an inverted T-shaped cross section which extends along the longitudinal center of the channel frame member 38 and the channel members 46 and is slidably disposed in the guide shoes 64 directly above the lift bar 62. The opposing surfaces of the lift bar 62 and the pusher bar 86 are supported and disposed in rolling bearing contact with a roller 88 rotatably mounted and extending between the guide shoes 64. Reciprocation of the pusher bar 86 to and from a retracted position and an advanced position is achieved, for example, by a double acting fluid actuated transfer cylinder 90 disposed adjacent to the lift cylinder 76 in the power section 24 as shown in FIG. 5. The closed end of the transfer cylinder 90 is pivotally mounted on a bracket 92 affixed to the base flange of the U-shaped frame member 38 and the projecting end of a piston rod 94 thereof is removably secured to an ear 96 extending laterally of and securely fastened to the side of the upstanding web of the pusher bar 86. The reciprocating travel of the pusher bar 86 is controlled in a manner similar to the lift bar 62 by a limit switch LS1 disposed longitudinally of the pusher bar 86 and adapted to be tripped by a pair of actuators 98a, 98b adjustably affixed to the pusher bar when it attains the fully advanced and fully retracted positions, respectively.

A series of pushers 100 are pivotally mounted at spaced intervals on a pivot pin 102 extending through the upstanding web portion of the pusher bar 86. The pushers 100 project upwardly therefrom so as to engage the work carriers 26 at substantially the midpoint thereof as shown in FIG. 3. Along those sections of the fixed supporting rails 42 which are electrified to provide an electroplating operation, the pushers 100 are provided with suitable insulation either on the work carrier contact surfaces or on the pivotable mounting thereof so as to be electrically insulated from the pusher bar 86. The pushers 100 are pivotable about the pivot pin 102 to an inoperative position as shown in phantom in FIG. 16 when the pusher contacts a work carrier 26 during the retracting movement thereof enabling passage thereof beneath the work carrier after which the pushers 100 again pivot to the operative position as shown in solid lines preparatory to the next advancing movement. Each of the pushers 100 is provided with suitable stop means such as a stop pin 104 which is adapted to engage the upper edge of the upstanding web of the pusher bar 86 to prevent pivoting of the pusher 100 during the advancing movement thereof. Accordingly, the work carriers 26 are intermittently advanced along the fixed supporting rails 42 by the principal pusher mechanism comprising the pusher bar 86 and the pushers 100 thereon until they attain a position corresponding to the last station of a treating receptacle at which time they must be raised in order to enable the work racks 86 suspended from the end engaging hook portions thereof to be transferred above the partitions 32 separating adjoining treating receptacles.

In order to enable the work carriers 26 to be advanced to a position on the input end portion of the lift rail sections 56 of the lift frame 48 and to enable advancement of a work carrier from the output portion of the lift rail sections 56 after the work carrier has been advanced across the tank partition 32, the base flange 50 of the lift frame 48 is provided with a pair of longitudinally inwardly extending notches 106 as may be best seen in FIG. 4, enabling movement of the pushers 100 of the principal pusher mechanism to a position beyond the ends of the lift frame.

The work carriers 26 are advanced from the input or load end portion of the lift frame 48 to the output or unload end portion thereof when the lift frame is in the raised position by an auxiliary pusher mechanism incorporated in each of the lift sections and which auxiliary pusher mechanism as shown in the exemplary lift section in FIGS. 3 and 4 is operatively connected to the principal pusher mechanism. The auxiliary pusher mechanism is comprised of a pair of sprockets 108a, 108b, which are rotatably mounted for rotation about a vertical axis on the upper surface of the base flange 50 of the lift frame 48. A continuous flexible element such as a transfer chain 110 is trained around the sprockets 108a, 108b, and to one link of which an auxiliary pusher 112 is pivotally mounted and movable thereby. A driven sprocket 114 is rotatably mounted on the base flange 50 intermediate of the sprockets 108a, 108b, and is disposed with the diametrically disposed portions thereof in engagement with the transfer chain 110 for causing it and the auxiliary pusher 112 thereon to move to and from a retracted position as shown in solid lines in FIG. 4 adjacent to the input or load end portion of the lift frame to an advanced position disposed adjacent to the output or unload end portion thereof.

A vertical shaft 116 is rotatably mounted and supported by a pair of bearings 118 affixed to one of the guide members 58 as shown in FIG. 3 and extends through the internal bore of the driven sprocket 114. The vertical shaft 116 can be provided with a splined or square cross section, for example, which is slidably disposed in the inner bore of the driven sprocket 114 of a corresponding shape to provide coacting engagement and preventing relative rotation therebetween. The lower end of the vertical shaft 116 is provided with a pinion gear 120 fixedly secured thereto which is disposed in constant meshing engagement with a rack 122 affixed to the side of the upstanding web of the pusher bar 86. Accordingly, as the pusher bar 86 is reciprocated to and from a retracted and an advanced position, the pinion gear 120 causes the vertical shaft 116 to rotate whereby the driven sprocket 114 rotatably engaged and slidably disposed thereon causes the transfer chain 110 to oscillate. When the lift frame 48 is moved to the fully raised position as shown in phantom in FIG. 3 the driven sprocket 114 slides upwardly along the shaft 116 remaining in coacting engagement thereon and is rotated thereby in response to the reciprocating movement of the pusher bar 86 and rack 122 in meshing engagement with the pinion gear 120.

The ratio between the rack 122 and the pinion gear 120 in constant meshing engagement therewith, is selected so that the auxiliary pusher 112 on the transfer chain 110 travels longitudinally of the lift rail sections 56 from a retracted position adjacent to the sprocket 108a to an advanced position adjacent to the sprocket 108b. In the specific arrangement shown, the advancing and retracting movement of the auxiliary pusher 112 coincides with the advancing and retracting movement of the pushers 100 of the principal pusher mechanism.

Figure 6:
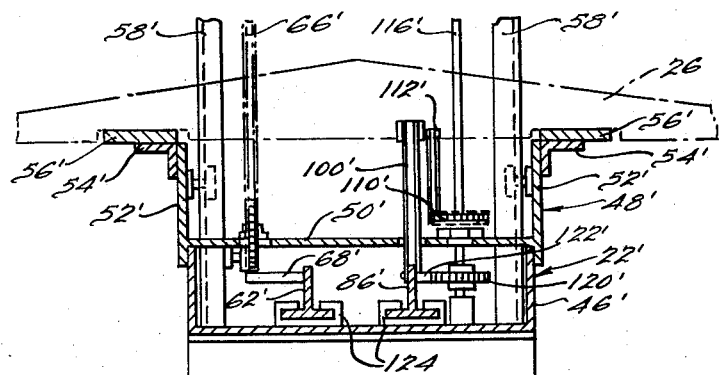
FIG. 6 is a fragmentary transverse vertical sectional view of an alternate satisfactory construction of the framework of the fixed transfer sections and combination elevating and transfer sections.

An alternate satisfactory construction of the lift frame and fixed transfer and power sections is illustrated in the lift section 22' shown in FIG. 6 which is of a shallow design in comparison to that heretofore shown and described in FIGS. 2 to 5. The basic components and operating sequence and construction of the shallow-type lift section 22' is identical to that hereinbefore described in connection with the lift section 22 shown in FIGS. 2 through 4 and like parts have been designated in FIG. 6 by the same number heretofore employed with a prime affixed thereto.

The wide shallow-type construction of the lift frame 48' as shown in FIG. 6, enables placement of the pusher bar 86' and lift bar 62' in side by side relationship which further reduces the head room requirement and increases the accessibility to the pusher and lift mechanisms facilitating their inspection and maintenance. The lift bar 62' and pusher bar 86' are slidably supported in guide shoes 124 affixed to the base flange of the U-shaped frame member 46' of the lift section 22'. The wide shallow lift frame 48' is movably supported on the guide members 58' and is raised and lowered by the lift chain 66' connected to the bracket 68' mounted on the lift bar 62'. The shaft 116' of the auxiliary transfer mechanism of the lift section is similarly rotated by the coaction between a pinion gear 120' affixed to the lower end thereof which is disposed in constant meshing relationship with a rack 122' affixed to the side of the upstanding web of the pusher bar 86'. A base flange 50' of the lift frame 48' is integrally connected to a pair of side flanges 52' which overlie the upper side edges of the frame member 46 and to the upper outer ends of which, a track support member 54' and lift rail section 56' are securely fastened. An auxiliary pusher 112' pivotally mounted on a transfer chain 110' is movable to and from an advance position and a retracted position in response to reciprocation of the pusher bar 86' and rotation of the shaft 116' geared thereto for advancing the work carrier 26 along the lift rail sections 56' when the lift frame 48' is in the raised position in the manner as hereinbefore described. Advancement of the work carrier to a position on the input end of the lift frame and off the output end thereof is achieved by the principal pushers 100' pivotally mounted on the pusher bar 86'.

As hereinbefore set forth, the relationship of the auxiliary transfer mechanism and principal transfer mechanism as shown and described in the lift sections 22 and 22' illustrated in FIGS. 2 through 4 and in FIG. 6, respectively, causes the auxiliary pusher 112, 112', to move in unison with the principal pushers 100, 100', to and from an advanced position and a retracted position in response to reciprocation of the pusher bar 86, 86'.

Figure 7:
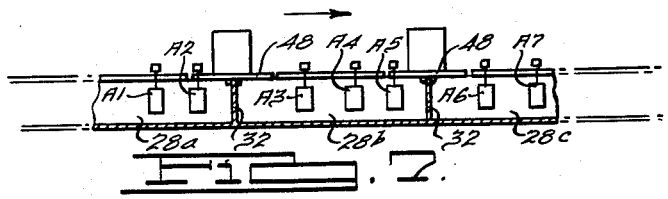
FIGS. 7 through 11 are schematic side elevation views illustrating a typical operating sequence of the conveying machine.

A typical operating sequence of the sectionalized conveying machine shown in FIGURES 1 through 6 is schematically illustrated in FIGS. 7 through 11 wherein a series of work racks A1 to A7 are sequentially conveyed along the fixed transfer sections and lift sections through treating receptacles 28a, 28b and 28c in the direction of the arrows. The conveying machine is shown in FIG. 7 at the completion of the advancing movement of the principal pusher mechanism and during which movement the work racks A2 and A5 are advanced to a position on the load end portion of the lift frames 48.

Figure 8:
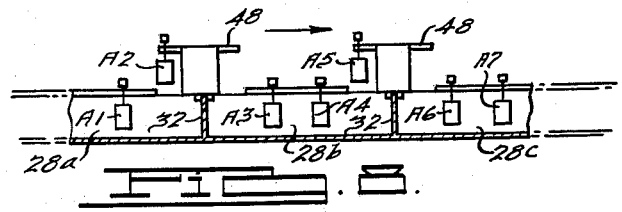
Figure 9:
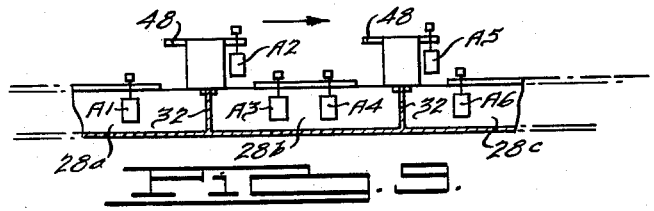

At the completion of the advancing movement of the pusher bar, the transfer control limit switch LS1 is tripped by the actuator 98a (FIG. 5) signaling the control circuit of the conveying machine which in turn energizes the lift cylinder 76 by directing hydraulic fluid into the blank-end thereof causing the lift bar 62 to commence its advancing movement whereby the lift frame 48 of each of the lift sections commence to rise from the lowered position as shown in FIG. 7 to the raised position as shown in FIG. 8. During the elevating movement of the lift frame 48, the work racks A2 and A5 are withdrawn from the treating receptacles 28a and 28b, respectively, whereby they can be transferred above the partition 32 separating adjoining treating receptacles. When the lift frames 48 attain the fully raised position, the actuator 84a (FIG. 5) contacts the lift control limit switch LS2 tripping it which in turn signals the control circuit of a principal conveying machine which stops the flow of hydraulic fluid into the blank-end of the lift cylinder 76.

During the elevating movement of the lift frame 48, the pusher bar 86 is retracted by the transfer cylinder 90 by opening a suitable valve, such as a solenoid actuated valve, for example, directing hydraulic fluid into the rod-end thereof until the transfer control limit switch LS1 is actuated by the actuator 98b (FIG. 5) which signals the control circuit that the transfer mechanism is in the fully retracted position and the valve is closed. The actuation of lift control limit switch LS2 by the actuator 84a and the transfer control limit switch LS1 by the actuator 98b signals the central control circuit that the lift frames have attained the fully elevated position and work carriers thereon are now in position to be transferred above the intervening tank partitions 32. Accordingly, the transfer cylinder 90 is actuated by directing hydraulic fluid into the blank end thereof and the work racks A2 and A5 positioned on the elevated lift frames 48 are advanced by the auxiliary pusher mechanism and the work racks A1, A3, A4, A6 and A7 positioned on the fixed transfer section are advanced by the principal pusher mechanism from the position shown in FIG. 8 to the position shown in FIG. 9.

At the completion of the advancing movement of the principal and auxiliary pusher mechanisms, the actuator 98a (FIG. 5) actuates transfer control limit switch LS1, which signals the central control system of the machine and the flow of hydraulic fluid to the blank end of the transfer cylinder 90 is stopped. Simultaneously the actuation of limit switch LS1 signals the control circuit that the work carriers A2 and A5 on the elevated lift frames 48 are now in proper position and hydraulic fluid is directed into the rod-end of the lift cylinder 76 which commences its retracting movement whereby the lift frames 48 are moved from the raised position shown in FIG. 9 to the lowered position shown in FIG. 10. During this movement, the work racks A2 and A5 are immersed in the treating solutions at the first station of the multiple station treating receptacles 28b and 28c, respectively. When the lift frames attain the fully lowered position, the lift control limit switch LS2 is tripped by actuator 48b signaling the central control circuit which stops the flow of hydraulic fluid into the rod-end of the lift cylinder 76.

During the descending movement of the lift frames 48 the transfer cylinder 90 is actuated whereby hydraulic fluid is directed into the rod end of the transfer cylinder 90 causing the pusher bar 62 to move from the advanced to the retracted positions whereby the pushers 100 thereon and the auxiliary pusher 112 of the auxiliary transfer mechanism of the lift sections are moved from the advanced to the fully retracted positions. At the completion of the retracting movement of the pusher bar, the actuator 98b (FIG. 5) actuates transfer control limit switch LS1 which halts the flow of hydraulic fluid into the rod end of the transfer cylinder 90 stopping it in the fully retracted position.

Figure 10:
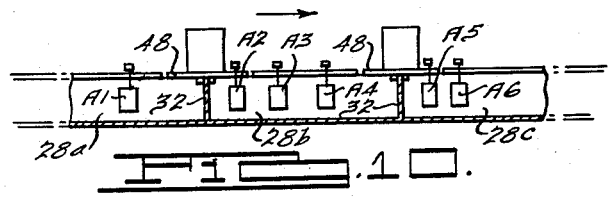
Figure 11:
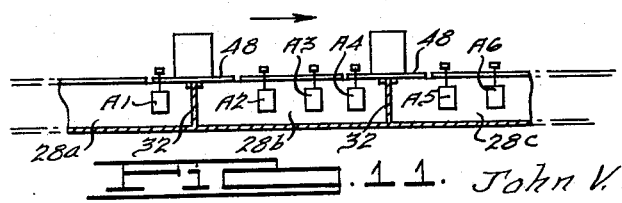

With the work carriers and the lift frames in the position as shown in FIG. 10 and with the pusher bar in the fully retracted position, a suitable down dwell timer is activated in response to the tripping of the lift control limit switch LS2 by the actuator 84b which commences to time a predetermined down dwell period whereby the workpieces on the work racks undergo a prescribed treating exposure. At the expiration of the down dwell timer, the control circuit of the conveying machine is signaled which in turn opens a solenoid actuated valve allowing hydraulic fluid to enter the blank end of the transfer cylinder 90 which commences its advancing movement whereby the work racks are advanced from the positions shown in FIG. 10 to the positions shown in FIG. 11. During this advancing movement the principal pusher mechanism is operative to advance the work racks A1 and A4 to the load end portions of the lift frames 48 and concurrently to advance the work racks A2 and A5 off the unload end portions of the lift frames. At the completion of the advancing movement of the pusher bar the actuator 98a (FIG. 5) actuates transfer control limit switch LS1, signaling the control circuit that the work racks are in proper position whereby the lift frames 48 can again be raised corresponding to the position shown in FIG. 7 and wherein the cycle hereinbefore described is again repeated.

In the foregoing operating sequence as illustrated in FIGS. 7 through 11, each of the work racks A1 through A7 is spaced a distance equivalent to two treating stations from the adjacent work rack or alternatively, are separated at one station intervals equivalent to two advancing movements of the principal pusher mechanism. An alternate satisfactory operating sequence to that heretofore described is achieved by reversing the direction of the movement of the auxiliary pusher 112 with respect to the movement of the principal pusher 100. This can be simply achieved by incorporating a reverse idler gear (not shown) between the pinion gear 120 (FIG. 3) and the rack 122 affixed to the pusher bar 86 whereby the direction of rotation of the driven sprocket 114 of the auxiliary pusher mechanism is reversed. Accordingly, the transfer chain 110 and the auxiliary pusher 112 thereon is retracted during the advancing movement of the pusher bar 86 and is advanced when the pusher bar is retracted.

The reverse movement of the auxiliary pusher mechanism with respect to the principal pusher mechanism enables the advancement of the work carriers along the fixed conveyor sections and power sections by employing only half the number of actuating movement of the transfer cylinder 90 in comparison to that required in accordance with the operating sequence described in FIGS. 7 through 11. As a result, the work racks are separated by a distance equivalent to only one treating station or, alternatively, are separated at one station intervals equivalent to one advancing stroke of the principal pusher mechanism.

A typical operating sequence of the reverse direction auxiliary pusher mechanism is schematically illustrated in FIGS. 12 to 15 wherein a pair of lift frames 48 are positioned above partitions 32 separating a series of multiple station treating receptacles 28d, 28e and 28f. A series of work racks B1 through B8 are supported on the rail sections of the machine and are sequentially conveyed through the treating solutions contained in the treating receptacles in the direction of the arrows.

The conveying machine is shown in FIG. 12 with the lift frames 48 in the fully lowered position and at the completion of the advancing stroke of the principal pusher mechanism whereby each of the work carriers have been advanced one station to the position shown. During the advancing movement the work racks B3 and B6 have been advanced to a position on the load end portion of each of the lift frames 48. The auxiliary pusher mechanisms in the lift frames 48 because of the reverse direction movement thereof are positioned in the fully retracted position. In that position the lift cylinder is actuated whereby the lift frames 48 move from the lowered position shown in solid lines in FIG. 12 to the raised position shown in phantom whereby the work racks B3 and B6 are elevated to the raised position shown in phantom. At the completion of the elevating movement of the lift frames 48 as signaled by lift control limit switch LS2, the transfer cylinder commences its retracting movement whereby the auxiliary pusher mechanisms commence their advancing movement and the work racks B3 and B6 are advanced along the lift rail sections above the tank partitions 32 from the position shown in solid lines in FIG. 13 to a position on the unload ends of the lift frames as shown in phantom.

At the completion of the retracting movement of the pusher bar as signaled by actuation of transfer control limit switch LS1, the lift cylinder is actuated and commences its retracting movement whereby the lift frames 48 are lowered from the elevated position shown in FIG. 13 to the fully lowered position shown in FIG. 14. Accordingly, the work racks B3 and B6 are immersed at the first station of the treating receptacles 28e and 28f, respectively.

At the completion of the descending movement of the lift frames 48 as signaled by the tripping of lift control signal limit switch LS2, the down dwell timer of the conveying machine is actuated which commences to time a predetermined down dwell period. At the expiration of the down dwell period as signaled by the down dwell timer, the transfer cylinder is actuated causing it to commence its advancing movement whereby all of the work racks B1 through B8 are advanced from the positions shown in FIG. 14 to the positions shown in FIG. 15. During the advancing movement of the principal transfer mechanism, the auxiliary pusher mechanism moves in the opposite direction from the advanced to the fully retracted position preparatory to their next advancing movement. Accordingly, the work racks B3 and B6 are advanced off the unload end portions of the lift frames 48 and work racks B2 and B5 are advanced to a position on the load end portions thereof preparatory to a repetition of the cycle hereinbefore described.

An alternate construction of a lift section is shown in FIG. 16 which is similar to that hereinbefore described in FIGS. 2 through 6. The lift section 126 as shown in FIG. 16 is distinguishable in that the lift rail sections do not extend the entire length of the lift frame, but instead a fixed intermediate pair of rail sections 128 mounted on longitudinal members 129 connected to the upper end of the inverted U-shaped guide members 58 which is fixed in an elevated position and is alignable with the inner ends of the lift rail sections 130a, 130b, mounted on a lift frame 132 when in the raised position as shown in phantom. The lift frame 132 is of the same U-shaped configuration as the lift frames 48 and 48' shown in FIGS. 3 and 6, respectively, but is provided with notched sides along the intermediate portion thereof to prevent interference with the longitudinal members 129 when in the fully raised position. In all other respects the construction of the lift section 126 is the same as that hereinbefore described, employing the same elevating mechanism and the same auxiliary pusher mechanism to effect advancement of a work carrier 26 from a position on the lift rail section 130a when in the raised position across the intermediate rail section 128 to a position on the lift rail section 130b. The reciprocating movement of the auxiliary pusher mechanism can be accomplished in unison with the reciprocating movement of the principal pusher mechanism as schematically shown in FIGS. 7 to 11 or in opposite directions employing a reversing idler gear as hereinbefore described, to achieve an operating sequence as schematically shown in FIGS. 12 through 15.

Still another alternate satisfactory construction of the lift sections is illustrated in FIGS. 17 through 19 which is employed for elevating and transferring the work carriers 26 and work racks 36 suspended therefrom across the partitions 32 separating the adjoining treating receptacles 28. The lift section 134 shown in FIGS. 17 and 18 is connected to the ends of the fixed conveyor sections 20 in a manner as hereinbefore described and comprises a pair of inverted U-shaped guide members 58 to the upper end portions of which a shallow intermediate frame member is secured to which a pair of fixed intermediate rail sections 136 are securely fastened and are maintained in an elevated position forming therewith a fixed elevated track section. An input lift end section 138 and an output lift end section 140 comprising shallow U-shaped channel members 142 incorporating lift rail sections 143 thereon and supported on cantilever supports 144 which are movably mounted between adjacent ones of the upright legs of the channel-shaped guide members 58 by a pair of rollers 146 disposed in rolling bearing contact against the inner surfaces thereof. The movement of the input lift section 138 and the output lift end section 140 to and from a raised position in alignment with the ends of the intermediate rail section 136 and a lowered position in alignment with the fixed supporting rails 42 of the fixed conveyor sections 20. The input lift end section 138 moves simultaneously with and in a direction opposite to the direction of the movement of the output lift end section 140 whereby when one lift end section is in the raised position the other lift end section is in the lowered position and vice versa.

The movement of the input and output lift end sections 138, 140 is achieved and coordinated by a flexible element such as a lift chain 148 which is trained over a pair of sprockets 150a, 150b, rotatably mounted about a horizontal axis to the side flanges of the intermediate frame member 139 and extends downwardly therefrom and around a pair of lower sprockets 152a, 152b rotatably mounted on the U-shaped frame member 46 of the lift section 134 and extends therefrom in opposite directions having the ends thereof pivotally connected to the lift bar.

The cantilever supports 144 of the input and output lift end sections 138, 140 are secured to a link of the lift chain 148 whereby on reciprocation of the lift bar to and from an advanced position and a retracted position, the lift end sections move in opposite directions to and from a raised position and a lowered position. When the lift end sections are in the raised position, the inner ends of the lift rail sections thereof are positioned in alignment with the ends of the intermediate rail section 136 and when in the lowered position the outer ends thereof are disposed in alignment with the fixed supporting rail sections 42 of the fixed conveyor sections.

The work carriers 26 are advanced from the adjacent fixed conveyor section 20 to about the midpoint of the input lift end section 138 when in the lowered position by the pusher 100 of the principal pusher mechanism. The work carriers 26 are removed from the midpoint of the output lift end section 140 when in the lowered position by the pushers 100 of the principal transfer mechanism. As is noted in FIG. 18 the lift end sections 138, 140, are each provided with a longitudinal inwardly extending notch 154 similar to the notches 106 in the lift section shown in FIG. 4 to enable the pushers 100 to advance beyond the input end of the lift end section 138 and to retract to a position beyond the output end of the lift end section 140.

Advancement of the work carriers 26 from a position on the input lift end section 138 to substantially the midpoint of the intermediate rail section 136 and thence along the intermediate rail section to a position on the output end section 140 when in the raised posittion is achieved by a secondary transfer mechanism mechanically connected to the principal transfer mechanism and operable in response thereto for effecting a transfer of the work carriers and work racks 36 suspended therefrom above the partitions 32 separating adjoining treating receptacles. The secondary transfer mechanism as shown in FIGS. 17 through 19 comprises a lever arm 156 pivotally mounted on a cross brace 158 extending between and affixed to the upright legs of the guide members 58. The lower end of the lever arm 156 is pivotally connected by a link 160 to the upstanding web of the pusher bar causing the lever arm to oscillate in response to reciprocation of the pusher bar from a position shown in solid lines in FIG. 17 to the position shown in phantom.

The upper telescoping end of the lever arm 156 is pivotally connected to a slide member 162 as is best seen in FIG. 19 which is slidably disposed in a slide guide 164 affixed to the base flange of the intermediate channel frame member 139. A secondary pusher 166a is pivotally mounted on the slide member 162 and is adapted to engage a work carrier positioned on the intermediate rail sections 136 and advance the work carrier therealong to a position on the output lift end section 140 when in the raised position during the retracting movement of the pusher bar 86. The secondary pusher 166a is pivoted in the same manner as the principal and auxiliary pushers hereinbefore described to enable the secondary pusher to pivot to an inoperative position during its retracting movement enabling it to pass beneath a work carrier and thereafter pivot to the operative position preparatory to the next advancing movement thereof.

The slide member 162 is provided with an engaging pin 168 depending from the left end thereof as viewed in the drawings and which projects through a longitudinal slot 170 in the base flange of the intermediate channel frame member 139 and is disposed in longitudinal alignment with the longitudinal axis of the slide guide 164. The engaging pin 168 is adapted to engage an aperture 172 in the forward end of a pusher slide 174 slidably mounted in guide shoes 176 on the input lift end section 138 for reciprocating the pusher slide 174 and a secondary pusher 166b pivotally mounted thereon from a retracted position to an advance position when the input lift end section 138 is in the raised position. As is best shown in FIG. 19, the slide member 162 and secondary pusher 166a thereon remains in the elevated position and reciprocates back and forth in response to the oscillating movement of the lever arm 156. The pusher slide 174 carried by the input lift end section 138 also reciprocates to and from a retracted and an advanced position and from a raised position and a lowered position in accordance with the ascending and descending movement of the input left end section 138. When the input lift end section moves from a lowered position as shown in solid lines in FIG. 17 to a raised position as shown in phantom, the forward end of the pusher slide 174 is disposed beneath the base flange of the intermediate channel frame member 139 and the aperture 172 therein is disposed in surrounding engagement about the engaging pin 168 on the slide member 162. Accordingly, as the pusher bar is moved from an advanced position to a retracted position, the lever arm 156 causes the slide member 162 and pusher slide 174 to move from a retracted position to an advanced position whereby the work carrier 26 positioned on the input lift end section 138 is advanced toward the right as viewed in the drawings to a position substantially at the midpoint of the intermediate rail sections 136 by the secondary pusher 166b. On the subsequent advancing movement of the pusher bar, the slide member 162 and the pusher slide 174 are moved in unison from the advanced position to a retracted position.

In view of the fact that the aperture 172 in the pusher slide 174 is oversized to provide satisfactory side clearance for alignment with the engaging pin 168 during the ascending movement of the input lift end section 138, it is preferred to incorporate vertically disposed cam 178 as shown in FIG. 17 having a cam surface 180 thereon which is adapted to contact the right end of the pusher slide 174 during its descending movement to assure that it is moved to the fully retracted position preparatory to the next advancing movement thereof.

The operating sequence of a typical conveying machine incorporating two of the lift sections 134 as shown in FIGS. 17 through 19, will now be described with particular reference to the schematic sequence drawings shown in FIGS. 20 through 24. The lift sections 134 are positioned above the partitions 32 of a series of multiple treating receptacles 28g, 28h and 28j, through which a series of work racks C1 through C6 are sequentially conveyed. The machine is shown in FIG. 20 at the completion of the advancing movement of the principal pusher mechanism whereby the work racks C2 and C5 have been advanced to a position on the input lift end sections 138. At the completion of the advancing movement of the principal pusher mechanism as signaled by transfer control limit switch LS1, the lift cylinder is actuated causing the lift bar to move from a retracted position to an advanced position whereby the input lift end sections 138 are moved from the lowered position as shown in solid lines in FIG. 20 to the raised position shown in phantom and the output lift end sections 140 are moved from the fully raised position as shown in solid line to the lowered position as shown in phantom. Accordingly, the work racks C2 and C5 are withdrawn from the treating receptacles 28g and 28h, respectively, and the work racks C3 and C6 are lowered at the first station of the treating receptacles 28h and 28j, respectively. When the input lift end section 138 approaches the raised position, the aperture 172 on the pusher slide 174 engages the engaging pin 168 on the slide member 162 (FIG. 19).

At the completion of the advancing movement of the lift bar as signaled by the actuation of lift control limit switch LS2, the control circuit is signaled that the work racks are in the proper position and the transfer cylinder is actuated causing the pusher bar to commence its retracting movement. During the retracting movement of the pusher bar the lever arm of the secondary transfer mechanism of each of the lift sections causes the slide member 162 (FIG. 19) and pusher slide 174 engaged thereby to move from a retracted to an advanced position whereby the secondary pushers 166b cause the work racks C2 and C5 to be advanced from a position on the input lift end sections 38 as shown in solid lines in FIG. 21 to a position substantially at the midpoint of the intermediate rail sections 136 as shown in phantom. The work racks C1, C3, C4, and C6 which are in the lowered position remain stationary during the retracting movement of the pusher bar.

At the same time, on the completion of the advancing movement of the lift bar as signaled by lift control limit switch LS2, a suitable down dwell timer in the control circuit of the principal conveying machine is energized which commences to time a predetermined down dwell period. At the completion of the retracting movement of the pusher bar and during the down dwell timing period, the transfer cylinder is again actuated and the work racks C1 and C4 are advanced along the fixed supporting rail sections and the work racks C3 and C6 are advanced off the output lift end sections 140 to a position on the adjacent fixed rail sections from the positions shown in solid lines in FIG. 21 to the positions shown in phantom. At the same time, the secondary pusher mechanism is moved from the advanced position to the retracted position. At the completion of the advancing movement of the pusher bar as signaled by the tripping of transfer control limit switch LS1, the lift cylinder is actuated causing it to commence its retracting movement whereby the input and output lift end sections 138, 140, are lowered and raised, respectively, from the positions shown in FIG. 21 to the positions shown in FIG. 22.

At the completion of the retracting movement of the left bar as signaled by the tripping of lift control limit switch LS2, the pusher bar is actuated and retracted from the advanced position to the retracted position whereby the secondary transfer mechanism commences its advancing movement and the work racks C2 and C5 positioned on the intermediate rail sections 136 of each of the lift sections are advanced by the secondary pusher 166a (FIG. 19) to a position on the output lift end sections 140 in the raised position as shown in phantom in FIG. 23. On attaining the fully retracted position the pusher bar actuates transfer control limit switch LS1. On the expiration of the down dwell period as signaled by the down dwell timer, the principal pusher mechanism is actuated and commences its advancing movement whereby the work racks C1, C3, C4 and C6 are advanced from the positions shown in solid lines in FIG. 23 to the positions shown in phantom and the slide member 162 and pusher slide 174 (FIG. 19) of the secondary pusher mechanism are retracted. As a result of the advancement of the pusher bar, the work racks C1 and C4 are advanced to a position on the input lift end sections 138 which are in the lowered position.

At the completion of the advancing movement of the pusher bar as signaled by actuation of transfer control limit switch LS1, the lift cylinder is actuated causing the lift bar to move from a retracted position to an advanced position whereby the work racks C1 and C4 are moved from a fully lowered position as shown in solid lines in FIG. 24 to a raised position shown in phantom and the elevated work racks C2 and C5 positioned on the output lift end sections 140 are lowered to the position shown in phantom at the first station of the multiple station treating receptacles 28h and 28j, respectively. In that position each of the work racks have been advanced to the next adjacent treating station from that shown in FIG. 20 and the cycle is again repeated in accordance with that hereinbefore described.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The combination of an elevating and transfer mechanism for elevating and conveying a work carrier through a series of treating stations comprising a framework including guide means thereon, track means on said framework for supporting a work carrier movably mounted thereon, at least the opposite end portions of said track means movable along said guide means to and from a lowered position and a raised position, lift means for raising and lowering said track means, and pusher means disposed below said track means for advancing a work carrier therealong when at least one of said opposite end portions of said track means is in said raised position.

2. The combination of an elevating and transfer mechanism for elevating and conveying a work carrier through a series of treating stations comprising a framework including guide means thereon, track means on said framework for supporting a work carrier movably mounted thereon, at least the opposite end portions of said track means movable along said guide means to and from a lowered position and a raised position, lift means for raising and lowering said track means, and pusher means disposed below said track means for advancing a work carrier therealong when at least one of said opposite end portions of said track means is in said raised position, said lift means comprising a lift bar slidably disposed on said framework below said track means and reciprocable to and from an advanced position and a retracted position, means for reciprocating said lift bar, roller means rotatably mounted on said framework, flexible means trained over said roller means and connected to said lift bar and said track means for raising and lowering said track means in response to the reciprocating movement of said lift bar.

3. The combination of an elevating and transfer mechanism for elevating and conveying a work carrier through a series of treating stations comprising a framework including guide means thereon, track means on said framework for supporting a work carrier movably mounted thereon, at least the opposite end portions of said track means movable along said guide means to and from a lowered position and a raised position, lift means for raising and lowering said track means, and pusher means disposed below said track means for advancing a work carrier therealong when at least one of said opposite end portions of said track means is in said raised position, said pusher means comprising a bar slidably disposed on said framework below said track means and reciprocable to and from an advanced position and a retracted position, means for reciprocating said bar, a flexible member mounted below and extending longitudinally of said track means, an engaging member on said flexible member for engaging and advancing a work carrier on said track means, and cooperating means for drivingly connecting said bar to said flexible member for reciprocating said engaging member thereon longitudinally of said track means in response to reciprocation of said bar.

4. The combination of an elevating and transfer mechanism for elevating and conveying a work carrier through a series of treating stations comprising a framework, track means for supporting a work carrier movably mounted thereon, including an intermediate section fixedly mounted on said framework in a raised position and a pair of end sections movably mounted on said framework and movable thereon to and from a raised position in end-to-end alignment with the ends of said intermediate section and a lowered position disposed below said intermediate section, guide means on said framework for movably supporting said end sections in said raised and said lowered position and during the ascending and descending movement thereof, lift means for moving said end sections to and from said raised and said lowered positions and pusher means disposed below said track means for advancing a work carrier along said intermediate section and at least one of said end sections when at least one of said end sections are in said raised position.

5. The combination of an elevating and transfer mechanism for elevating and conveying a work carrier through a series of treating stations comprising a framework, track means for supporting a work carrier movably mounted thereon, including an intermediate section fixedly mounted on said framework in a raised position and a pair of end sections movably mounted on said framework and movable thereon to and from a raised position in end-to-end alignment with the ends of said intermediate section and a lowered position disposed below said intermediate section, guide means on said framework for movably supporting said end sections in said raised and said lowered position and during the ascending and descending movement thereof, lift means for moving said end sections to and from said raised and said lowered positions, said lift means comprising a lift bar slidably disposed on said framework below said track means and reciprocable to and from an advanced position and a retracted position, means for reciprocating said lift bar, roller means rotatably mounted on said framework, flexible means trained over said roller means and connected to said lift bar and said end sections for raising and lowering said end sections in response to the reciprocating movement of said lift bar, and pusher means disposed below said track means for advancing a work carrier along said intermediate section and at least one of said end sections when at least one of said end sections are in said raised position.

6. The combination of an elevating and transfer mechanism for elevating and conveying a work carrier through a series of treating stations comprising a framework, a lift frame movably mounted on said framework, track means for supporting a work carrier movably mounted thereon and including an intermediate section fixedly mounted on said framework in a raised position and a pair of end sections mounted on said lift frame and movable thereby to and from a raised position in end-to-end alignment with the ends of said intermediate section and a lowered position disposed below said intermediate section, guide means on said framework for guidably supporting said lift frame and said end sections thereon when in said raised and said lowered position and during the ascending and descending movement thereof, lift means for moving said lift frame to and from said raised position and said lowered position, and pusher means on said lift frame disposed below said track means for advancing a work carrier along said intermediate section and said end sections when said lift frame is in said raised position.

7. The combination of an elevating and transfer mechanism for elevating and conveying a work carrier through a series of treating stations comprising a framework including track means thereon for supporting a work carrier movably mounted thereon, said track means including an intermediate section fixedly mounted on said framework in a raised position and a pair of end sections including an input section and an output section movably mounted on said framework and movable in opposite directions to and from a raised position in end-to-end alignment with the input and output ends respectively of said intermediate section and a lowered position disposed below said intermediate section, guide means on said frame for supporting said pair of end sections when in said raised and said lowered positions and during the ascending and descending movement thereof, lift means for moving said pair of end sections to and from said raised and said lowered positions, and pusher means disposed below said track means for advancing a work carrier from said input section along said intermediate section to a position on said output section when said input section and said output section alternately are in said raised position.

8. The combination of an elevating and transfer mechanism for elevating and conveying a work carrier through a series of treating stations comprising a framework, a lift frame movably mounted on said framework, track means for supporting a work carrier movably mounted thereon including an intermediate section fixedly mounted on said framework in a raised position and a pair of end sections mounted on said lift frame and movable thereby to and from a raised position in end-to-end alignment with the ends of said intermediate section and a lowered position disposed below said intermediate section, guide means on said framework for supporting said lift frame and said end sections thereon in said raised and said lowered position and during the ascending and descending movement thereof, lift means for moving said lift frame to and from said raised and said lowered positions, and pusher means on said lift frame for advancing a work carrier along said intermediate section and said end sections when said lift frame is in said raised position, said pusher means comprising a pusher bar slidably disposed on said framework below said lift frame, means for reciprocating said pusher bar to and from an advanced position and a retracted position, a flexible member movably mounted on said lift frame below said end sections and extending longitudinally thereof, engaging means on said flexible member for engaging and advancing a work carrier on said end sections and said intermediate section when said lift frame is in said raised position, and cooperating means for drivingly connecting said pusher bar to said flexible element for reciprocating said engaging means longitudinally of said lift frame in response to the reciprocation of said pusher bar.

9. The combination of an elevating and transfer mechanism for elevating and conveying a work carrier through a series of treating stations comprising a framework including track means thereon for supporting a work carrier movably mounted thereon, said track means including an intermediate section fixedly mounted on said framework in a raised position and a pair of end sections including an input section and an output section movably mounted on said framework and movable in opposite directions to and from a raised position in end-to-end alignment with the input and output ends respectively of said intermediate section and a lowered position disposed below said intermediate section, guide means on said frame for supporting said pair of end sections when in said raised and said lowered positions and during the ascending and descending movement thereof, lift means for moving said pair of end sections to and from said raised and said lowered positions, and pusher means disposed below said track means for advancing a work carrier from said input section along said intermediate section to a position on said output section when said input section and said output section alternately are in said raised position, said pusher means comprising a pusher bar slidably disposed on said frame below said lift frame, means for reciprocating said pusher bar to and from an advanced position and a retracted position, a first slide member slidably disposed on and longitudinally of said intermediate section and reciprocable longitudinally thereof along at least a portion of said intermediate section to a position beyond the output end thereof, first engaging means on said first slide member for engaging a work carrier on said intermediate section, means operatively connecting said first slide member to said pusher bar for reciprocating said slide member in response to the reciprocating movement of said pusher bar, a second slide member slidably mounted on said input end section, coacting means operatively connecting said first slide member to said second slide member when said input end section is in said raised position for reciprocating said second slide member to and from an advanced position and a retracted position longitudinally of said input end section to a position along at least a portion of said intermediate section, and second engaging means on said second slide member for engaging a work carrier on said input end section.

10. The combination of an elevating and transfer mechanism for elevating and conveying a carrier through a series of treating stations comprising a framework including track means thereon for supporting a work carrier movably mounted thereon, said track means including an intermediate section fixedly mounted on said framework in a raised position and a pair of end sections including an input section and an output section movably mounted on said framework and movable in opposite directions to and from a raised position in end-to-end alignment with the input and output ends respectively of said intermediate section and a lowered position disposed below said intermediate section, guide means on said framework for supporting said pair of end sections when in said raised and in said lowered positions and during the ascending and descending movement thereof, pusher means disposed below said track means for advancing a work carrier from said input section along said intermediate section to a position on said output section when said input section and said output section alternately are in said raised position, and lift means for moving said pair of end sections to and from said raised and said lowered positions, said lift means comprising a lift bar slidably disposed on said framework below said track means and reciprocable to and from an advanced position and a retracted position, means for reciprocating said lift bar, roller means rotatably mounted on said guide means, flexible means trained over said roller means having the ends thereof extending in opposite directions and connected to said lift bar, said input section and said output section connected to an intermediate portion of said flexible means and movable thereby in opposite directions to and from said raised position and said lowered position in response to reciprocation of said lift bar.

11. A sectionalized conveying machine comprising at least one combination elevating and transfer section having an input end and an output end and at least one fixed conveyor section connected to at least one end of said combination section, said fixed section comprising an elongated first frame including first track means thereon for movably supporting a work carrier movably mounted thereon, said combination section comprising a second frame including a guide frame extending upwardly therefrom, second track means on said guide frame for elevating and transferring a work carrier movably mounted thereon, at least the input end and the output end of said second track means movably mounted on said guide frame and movable thereon to and from a lowered position in end-to-end alignment with said first track means and a raised position spaced upwardly therefrom, and lift means for raising and lowering said second track means, first pusher means disposed below said first track means for advancing a work carrier along said first track means and on to said input end and off said output end of said second track means when in said lowered position, and second pusher means for advancing a work carrier from said input end to said output end of said second track means when in said raised position.

12. A sectionalized conveying machine comprising at least one combination elevating and transfer section having an input end and an output end and at least one fixed conveyor section connected to at least one end of said combination section, said fixed section comprising an elongated first frame including first track means thereon for movably supporting a work carrier movably mounted thereon, said combination section comprising a second frame including a guide frame extending upwardly therefrom, second track means on said guide frame for elevating and transferring a work carrier movably mounted thereon, at least the input end and the output end of said second track means movably mounted on said guide frame and movable thereon to and from a lowered position in end-to-end alignment with said first track means and a raised position spaced upwardly therefrom, and lift means for raising and lowering said second track means, first pusher means disposed below said first track means for advancing a work carrier along said first track means and on to said input end and off said output end of said second track means when in said lowered position, and second pusher means for advancing a work carrier from said input end to said output end of said second track means when in said raised position, said lift means of said combination section comprising a lift bar slidably mounted on said second frame below said second track means and reciprocable to and from an advanced position and a retracted position, means for reciprocating said lift bar, roller means rotatably mounted on said guide frame, and flexible means trained over said roller means and connected to said lift bar and said second track means for raising and lowering said second track means in response to the reciprocating movement of said lift bar.

13. A sectionalized conveying machine comprising at least one combination elevating and transfer section having an input end and on output end and at least one fixed conveyor section connected to at least one end of said combination section, said fixed section comprising an elongated first frame including first track means thereon for movably supporting a work carrier movably mounted thereon, said combination section comprising a second frame including a guide frame extending upwardly therefrom, second track means on said guide frame for elevating and transferring a work carrier movably mounted thereon, at least the input end and the output end of said second track means movably mounted on said guide frame and movable thereon to and from a lowered position in end-to-end alignment with said first track means and a raised position spaced upwardly therefrom, and lift means for raising and lowering said second track means, first pusher means comprising a pusher bar slidably mounted on said first and said second frames and extending longitudinally thereof below said first track means, means for reciprocating said pusher bar to and from an advanced position and a retracted position, first engaging means on said pusher bar for engaging and advancing a work carrier along said first track means and on to said input end and off said output end of said second track means when in said lowered position during the advancing movement of said pusher bar, second pusher means including a flexible member movably mounted below and extending longitudinally of said second track means, second engaging means on said flexible member for engaging a work carrier on said second track means, and cooperating means for drivingly connecting said flexible member and said pusher bar for moving said flexible member and said second engaging means thereon longitudinally of said second track means to and from said input end and said output end in response to the reciprocating movement of said pusher bar.

14. In a sectionalized conveying machine adapted to be supported on the upper edge of an aligned series of treating receptacles, the combination comprising at least one combination elevating and transfer section having an input end and an output end and at least one fixed conveyor section connected to at least one end of said combination section, said fixed section comprising an elongated first frame including first track means thereon for movably supporting a work carrier movably mounted thereon, said combination section comprising a second frame including a guide frame extending upwardly therefrom, a lift frame movably mounted on said guide frame, second track means for supporting a work carrier movably mounted thereon and including an intermediate section fixedly mounted on said guide frame in a raised position and a pair of end sections including an input section and an output section mounted on said lift frame and movable thereby to and from a raised position in end-to-end alignment with the ends of said intermediate section and a lowered position disposed in end-to-end alignment with said first track means, and lift means for moving said lift frame to and from said raised position and said lowered position, first pusher means disposed below said first track means for advancing a work carrier along said first track means and on to said input section and off said output section of said second track means when said lift frame is in said lowered position, and second pusher means for advancing a work carrier from said input section along said intermediate section to a position on said output section when said lift frame is in said raised position.

15. In a sectionalized conveying machine adapted to be mounted on the upper edges of an aligned series of treating receptacles, the combination comprising at least one combination elevating and transfer section having an input end and an output end and at least one fixed conveyor section connected to at least one end of said combination section, said fixed section comprising an elongated first frame including first track means thereon for movably supporting a work carrier movably mounted thereon, said combination section comprising a second frame including a guide frame extending upwardly therefrom, second track means including an intermediate section fixedly mounted on said guide frame in a raised position and a pair of end sections including an input section and an output section movably mounted on said guide frame and movable in opposite directions to and from a raised position wherein one of said sections is disposed in end-to-end alignment with one end of said intermediate section and the other end section is in the lowered position in end-to-end alignment with said first track means and vice versa, and lift means for moving said pair of end sections in opposite directions to and from said raised and said lowered positions, first pusher means disposed below said first track means for advancing a work carrier along said first track means and on to said input end section when in said lowered position and off said output end section and along the adjoining said first track means when said output section is in said lowered position, and second pusher means for advancing a work carrier from said input end section to a position on said intermediate section when said input section is in the raised position and from said intermediate section to a position on said output section when said output section is in said raised position.

References Cited in the file of this patent

UNITED STATES PATENTS

| | | |
|---|---|---|
| 2,849,097 | Jackson | Aug. 26, 1958 |
| 2,887,210 | Borodin | May 19, 1959 |